United States Patent
Wagner et al.

(10) Patent No.: US 11,345,491 B1
(45) Date of Patent: May 31, 2022

(54) DEVICE FOR DOSING A POWDER, IN PARTICULAR A PULVERULENT PHARMACEUTICAL

(71) Applicant: Syntegon Technology GmbH, Waiblingen (DE)

(72) Inventors: Bernhard Wagner, Schorndorf (DE); Thomas Brinz, Bissingen an der Teck (DE)

(73) Assignee: Syntegon Technology GmbH, Waiblingen (DE)

( * ) Notice: Subject to any disclaimer, the term of this patent is extended or adjusted under 35 U.S.C. 154(b) by 0 days.

(21) Appl. No.: 17/580,278

(22) Filed: Jan. 20, 2022

(30) Foreign Application Priority Data

Jan. 27, 2021 (DE) ..................... 10 2021 101 833.1

(51) Int. Cl.
*B65B 1/32* (2006.01)
*B65B 1/36* (2006.01)
*B65B 1/08* (2006.01)

(52) U.S. Cl.
CPC ............. *B65B 1/32* (2013.01); *B65B 1/08* (2013.01); *B65B 1/36* (2013.01)

(58) Field of Classification Search
CPC ..... B65B 1/32; B65B 1/08; B65B 1/36; B65B 1/04; B65B 1/22; B65B 1/30
See application file for complete search history.

(56) References Cited

U.S. PATENT DOCUMENTS

| 3,119,529 | A | * | 1/1964 | Maestrelli | ............. | D06F 43/085 |
| | | | | | | 222/445 |
| 4,708,534 | A | * | 11/1987 | Gallant | ................ | B24C 7/0046 |
| | | | | | | 406/75 |

(Continued)

FOREIGN PATENT DOCUMENTS

| DE | 19742663 A1 | 6/1998 |
| DE | 102006034115 A1 | 1/2008 |

(Continued)

*Primary Examiner* — Nicolas A Arnett
(74) *Attorney, Agent, or Firm* — Michael Best & Friedrich LLP

(57) ABSTRACT

A device (10) for dosing a powder, in particular a pulverulent pharmaceutical, having a storage container (24) which has a storage chamber for storing a stored quantity of the powder to be dosed, wherein the storage container has a dosing opening (32), wherein the device has a dosing control element which can be movably driven and which, in a closing position, closes the dosing opening and, in at least one freeing position, frees the dosing opening for the dispensing of powder from the storage container into a target container to be filled, wherein the device has a vibration means which sets the powder in vibration in order to assist with the dispensing of powder, wherein the storage container has two container parts which are movable relative to one another and which delimit mutually connected sub-chambers of the storage chamber and each store a portion of the stored quantity of powder, wherein a first container part (28) has the dosing opening and wherein the vibration means cooperates with the first container part and thus sets the (Continued)

portion of the powder that is disposed in the first container part in vibration, and wherein the vibration means is uncoupled from the second container part (30).

16 Claims, 7 Drawing Sheets

(56) References Cited

U.S. PATENT DOCUMENTS

| | | | | |
|---|---|---|---|---|
| 5,038,839 | A * | 8/1991 | Morimoto | G01G 15/006 141/83 |
| 7,770,761 | B2 * | 8/2010 | Luchinger | G01F 13/001 222/453 |
| 8,267,279 | B2 * | 9/2012 | Luechinger | G01F 13/001 222/311 |
| 8,393,497 | B2 * | 3/2013 | Fontaine | B65B 1/22 366/279 |
| 8,448,817 | B2 * | 5/2013 | Bloechlinger | G01F 13/00 141/2 |
| 8,720,497 | B2 * | 5/2014 | Meckstroth | B65B 1/08 222/196 |
| 9,327,850 | B2 * | 5/2016 | Bailey | B65B 1/32 |
| 10,118,188 | B2 * | 11/2018 | Wang | G01F 13/001 |
| 10,722,910 | B2 * | 7/2020 | Tapphorn | B05C 19/06 |
| 10,745,163 | B2 * | 8/2020 | Trebbi | H02K 49/104 |
| 2008/0302835 | A1 * | 12/2008 | Luechinger | G01G 13/024 222/1 |
| 2015/0021364 | A1 * | 1/2015 | Zehnder | G01F 13/001 222/504 |
| 2015/0136272 | A1 * | 5/2015 | Brenneis | B65B 1/34 141/69 |
| 2018/0155068 | A1 * | 6/2018 | Bailey | B65B 1/32 |

FOREIGN PATENT DOCUMENTS

| | | |
|---|---|---|
| DE | 202013009167 U1 | 1/2014 |
| EP | 2014372 A1 | 1/2009 |

* cited by examiner

DEVICE FOR DOSING A POWDER, IN PARTICULAR A PULVERULENT PHARMACEUTICAL

BACKGROUND

The invention relates to a device for dosing a powder, in particular a pulverulent pharmaceutical, having a storage container which has a storage chamber for storing a stored quantity of the powder to be dosed, wherein the storage container has a dosing opening, wherein the device has a dosing control element which can be movably driven and which, in a closing position, closes the dosing opening and, in at least one freeing position, frees the dosing opening for the dispensing of powder from the storage container into a target container to be filled, wherein the device has a vibration means which sets the powder in vibration in order to assist with the dispensing of powder.

EP 2 014 372 A1 discloses a dosing device having a linearly displaceable closure element which closes or frees a delivery orifice of a dosing unit. In order to assist with the delivery of the powder there is provided an impact mechanism with which the closure element, overlying a respective freeing position of the closure element, can be moved to and fro in order to assist with the delivery of powder.

DE 10 2006 034 115 A1 discloses a dosing device which likewise comprises a vibration exciter. This cooperates, as in EP 2 014 372 A1, with a rod of the closing device or with a storage container for the powder.

SUMMARY

Proceeding therefrom, the object underlying the present invention is to provide a device which permits highly accurate dosing of even very small quantities of powder.

This object is achieved according to the invention in a device mentioned at the beginning in that the storage container has two container parts which are movable relative to one another and which delimit mutually connected sub-chambers of the storage chamber and each store a portion of the stored quantity of powder, wherein a first container part has the dosing opening and wherein the vibration means cooperates with the first container part and thus sets the portion of the powder that is disposed in the first container part in vibration, and wherein the vibration means is uncoupled from the second container part.

In the device according to the invention, a vibrating movement is induced only in the first container part, which has the dosing opening. The second container part is uncoupled from this excitation, so that the vibrating movement is not induced in the second container part.

The two container parts delimit mutually connected sub-chambers of the storage chamber. This means that a portion of the stored quantity of powder is stored in each of the container parts. By inducing vibrations in only the first container part, however, predominantly only the powder that is stored in the first container part and is to emerge from the dosing opening of the first container part is excited in a vibrating manner. This permits particularly precise excitation of the powder. In this manner, it is possible to avoid adhesion of powder particles precisely in the region from which powder is to be dosed into a target container. The portion of the stored quantity of powder that is disposed in the second container part, on the other hand, is excited only indirectly, by contact of the portion of the powder that is disposed in the second container part with the portion of the powder that is disposed in the first container part. This also allows a comparatively small vibratory drive to be used. In this manner, it is in particular also possible to use a piezo drive, which can oscillate with a particularly high frequency if required but in principle is able to generate only small amplitudes.

In particular when the dosing control element is movable steplessly into multiple freeing positions which correlate with a varying size of the dosing cross-section freed in the region of the dosing opening, the device permits not only highly accurate dosing of even very small quantities of powder but also flexible dosing of different types of powder with different pouring and/or flow properties. In other words: The device allows vibration to be imparted in a targeted manner to precisely that portion of the stored quantity of a type of powder to be dosed.

A vibration axis along which the first container part is set in vibration preferably runs parallel to an axis along which powder is dispensed from the dosing opening during the dosing process. In other words: The first container part is moved to and fro relative to the second container part in such a manner that a distance between the two container parts is made smaller or larger according to the vibration frequency of the vibration means. An axis along which the two container parts are movable relative to one another preferably likewise runs parallel to the above-mentioned axis along which powder is dispensed from the dosing opening.

In particular, it is preferred if at least the first container part is produced from a rigid material, in particular from a metallic material. This allows a vibration movement to be introduced directly and without loss into the first container part and, from there, to be transferred to the portion of the stored quantity of the powder to be dosed that is disposed in the first container part. The second container part is preferably also produced from a rigid material, in particular from metal.

In order further to improve the accuracy of dosing, it is preferred if the first container part is funnel-shaped, that is to say the interior thereof tapers in particular in a frusto-conical manner towards the dosing opening.

The second container part is preferably cylindrical, which is advantageous in particular if mutually facing cross-sections of the two sub-chambers are of the same size. The cross-section of the sub-chamber of the second container part that is immediately adjacent to the sub-chamber of the first container part is thus preferably circular, wherein the cross-section of the sub-chamber of the first container part that directly faces the second container part is likewise circular and wherein the mentioned circular cross-sections are identical in size and are arranged collinearly with an imaginary central axis.

In order to assist with the delivery of the powder, it is further preferred if, based on the direction of gravity, the first container part is arranged at the bottom and the second container part is arranged at the top. A central container axis can thereby extend along a vertical axis, that is to say parallel to the direction of gravity. It is conceivable for the storage container to be sloping.

Between the container parts there is preferably arranged a resilient annular or tubular element which bounds a transition region between the sub-chambers of the storage container. Ideally, a cross-section bounded by the at least one resilient annular or tubular element is identical, based on a central axis of the storage container, to the cross-sections of the sub-chambers of the storage container discussed hereinbefore. In this manner, an undesirable accumulation of powder in the region of the transition between the container parts can be avoided; at the same time, reliable feeding of powder from the second container part into the first container part is ensured.

For simplified handling of the storage container, it is further preferred if, for connecting the container parts, a connecting element is provided which radially outwardly surrounds the at least one annular or tubular element. Such a connecting element thus allows the first container part to be fastened to the second container part while maintaining the movability of the first container part relative to the second container part.

It is further preferred if the mentioned connecting element can be connected or is connected releasably to the first container part. In this manner, it is possible—after removing the storage container from the device—to open the storage container and fill it with powder.

This filling process is particularly simple if the second container part has a container closure through which the drive portion of the dosing control element passes in a powder-tight manner. This allows the container closure, together with the dosing control element which is closed off in a powder-tight manner, to be used as the bottom boundary of the second container part during filling of the second container part with powder, in order subsequently to fit the first container part again, preferably using the above-mentioned at least one resilient annular or tubular element and the above-mentioned connecting element. The storage container so filled can then be joined to the device again.

It is thus particularly advantageous if the storage container is provided in the form of a cartridge which is held interchangeably on the device. This means that filling of such a cartridge takes place outside the device and detached from the device, but the filled cartridge can easily be joined to the device and removed therefrom again.

In this context, it is particularly preferred if the device comprises at least two cartridges, wherein a first cartridge is held on the device and wherein a second cartridge contains a further stored quantity of the powder to be dosed. This allows the device to be used permanently and at least largely without non-productive times. In addition, a change to a powder of a different type, that is to say, for example, to a different pharmaceutical, can be made particularly simply.

It is further preferred if the device has a frame on which a drive for the dosing control element and/or a vibratory drive for the vibration means is or are arranged. In this manner, a compact unit can be produced.

In order to simplify handling further, it is provided that the device has a clamping device for the releasable connection of the vibration means and the first container part and/or a clamping device for the releasable connection of the frame and the second container part and/or a clamping device for the releasable connection of the drive for the dosing control element and the dosing control element. In particular when the device has all three clamping devices mentioned above, rapid and simple fitting and removal of the storage container and of the dosing control element to the device is possible.

In one embodiment of the invention, it is proposed that the device has a volume flow measuring device, in particular a capacitive volume flow measuring device, for measuring a volume flow of the powder dispensed from the storage container into the target container to be filled, and/or that the device has a weight measuring device for measuring the weight of the quantity of powder dispensed into the target container. This permits simple, optionally redundant monitoring of the dosing process.

It is particularly preferred if the device has a control device for controlling the vibration means and the drive of the dosing control element, and that the control device is coupled with the volume flow measuring device and/or with the weight measuring device. This allows a control circuit to be produced, with which the dosing control element and the vibration means are controllable in dependence on the quantity of powder actually dispensed. For example, a vibration frequency of the vibration means can be changed, in particular also while maintaining a stationary freeing position of the dosing control element.

In a further embodiment of the device, it is possible that the dosing control element is not only movable along a dosing control element axis, in order to be able to adopt a closing position and different freeing positions, but is additionally rotatable about that axis. This allows a further movement to be induced in the stored quantity of powder, in particular if the dosing control element is provided at least in the region of the second container part with stirring elements, in particular stirrer blades.

BRIEF DESCRIPTION OF THE DRAWINGS

Further features and advantages of the invention are the subject of the following description and of the illustration in the drawing of a preferred exemplary embodiment.

In the drawing

DETAILED DESCRIPTION

Figure 1:
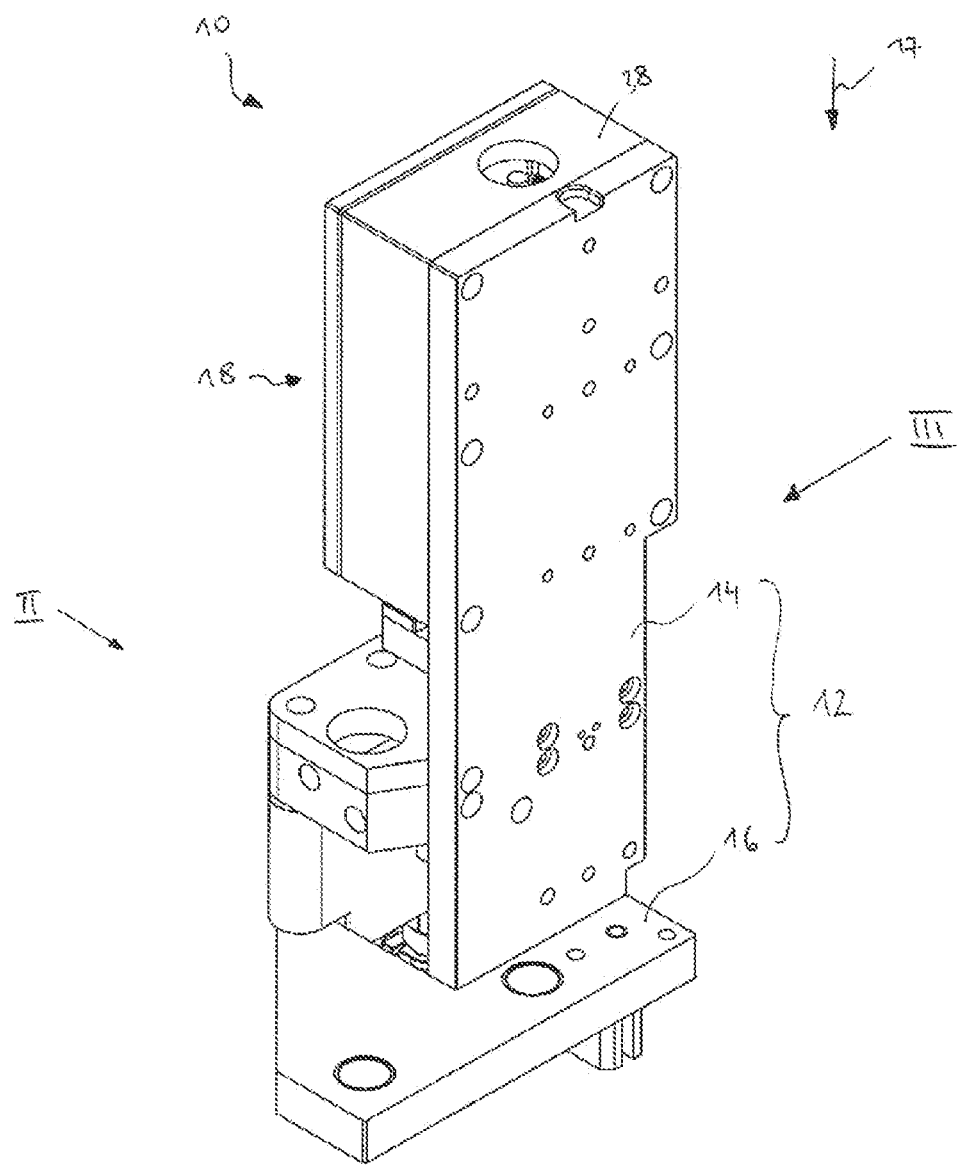
FIG. 1 shows a perspective illustration of an embodiment of a device for dosing a powder.

An embodiment of a device for dosing a powder is generally denoted with the reference numeral 10 in the drawing. The device 10 has a frame 12, which is shown in FIG. 1 from a rear perspective, having a first frame plate 14 and a second frame plate 16. In the use position of the device, the first frame plate 14 extends in a vertical plane which extends parallel to a direction of gravity, which is denoted with the reference numeral 17. The second frame plate 16 extends in a horizontal plane.

The frame 12 serves for the permanent arrangement of a drive 18, by means of which a needle-shaped dosing control element (see FIG. 3) can be movably driven along an axis 22.

Figure 2:
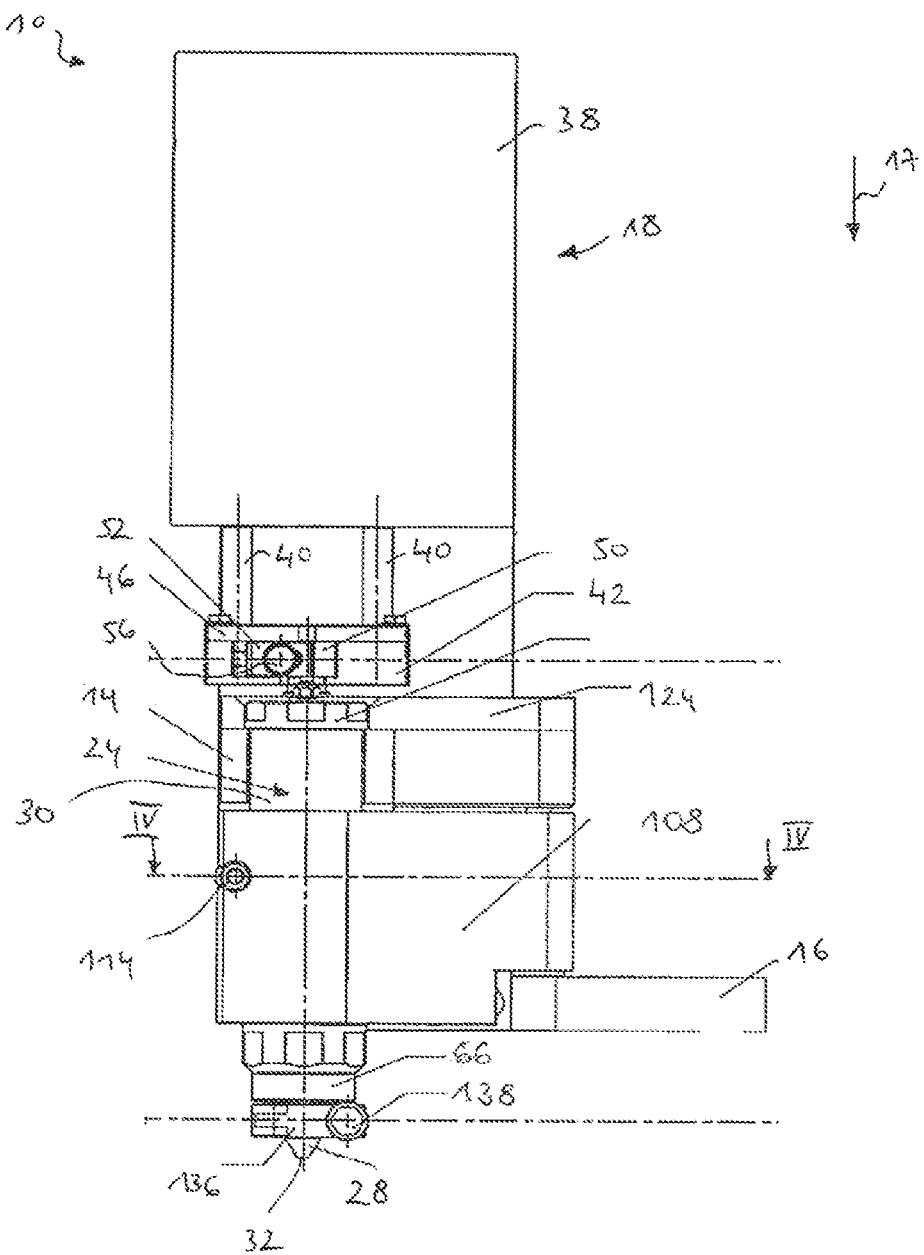
FIG. 2 is a front view of the device according to FIG. 1 in a viewing direction denoted II in FIG. 1.
Figure 5:
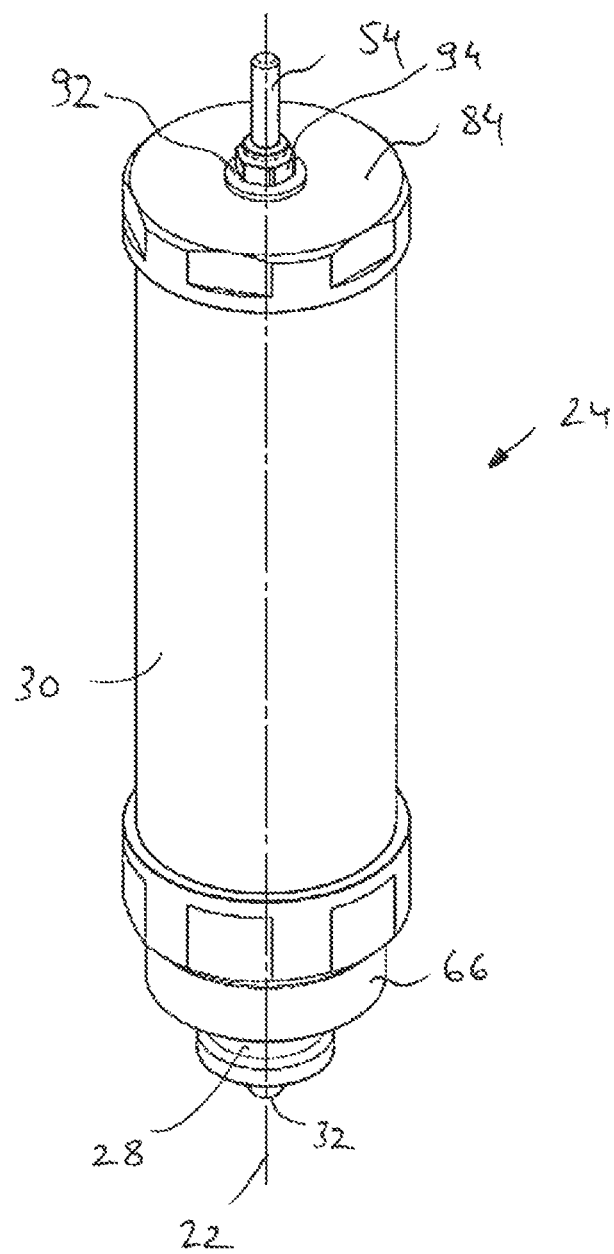
FIG. 5 is a perspective view of a storage container of the device according to FIG. 1.
Figure 6:
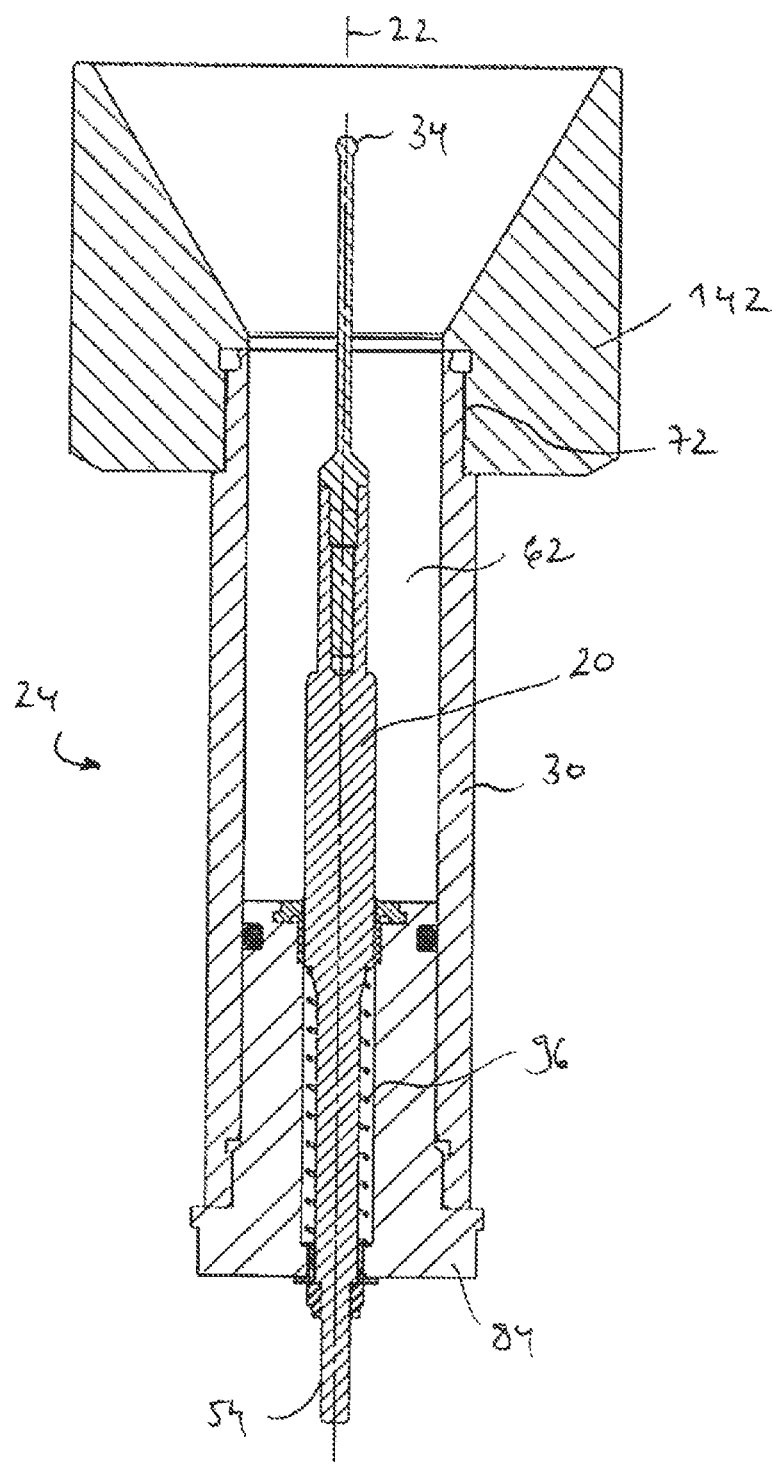
FIG. 6 is a vertical section of part of the storage container according to FIG. 5 during the filling thereof with powder.

The frame 12 additionally serves for the repeatably releasable arrangement of a storage container 24 for storing a stored quantity of a powder to be dosed, in particular of a pulverulent pharmaceutical, see FIGS. 2 and 5.

Figure 3:
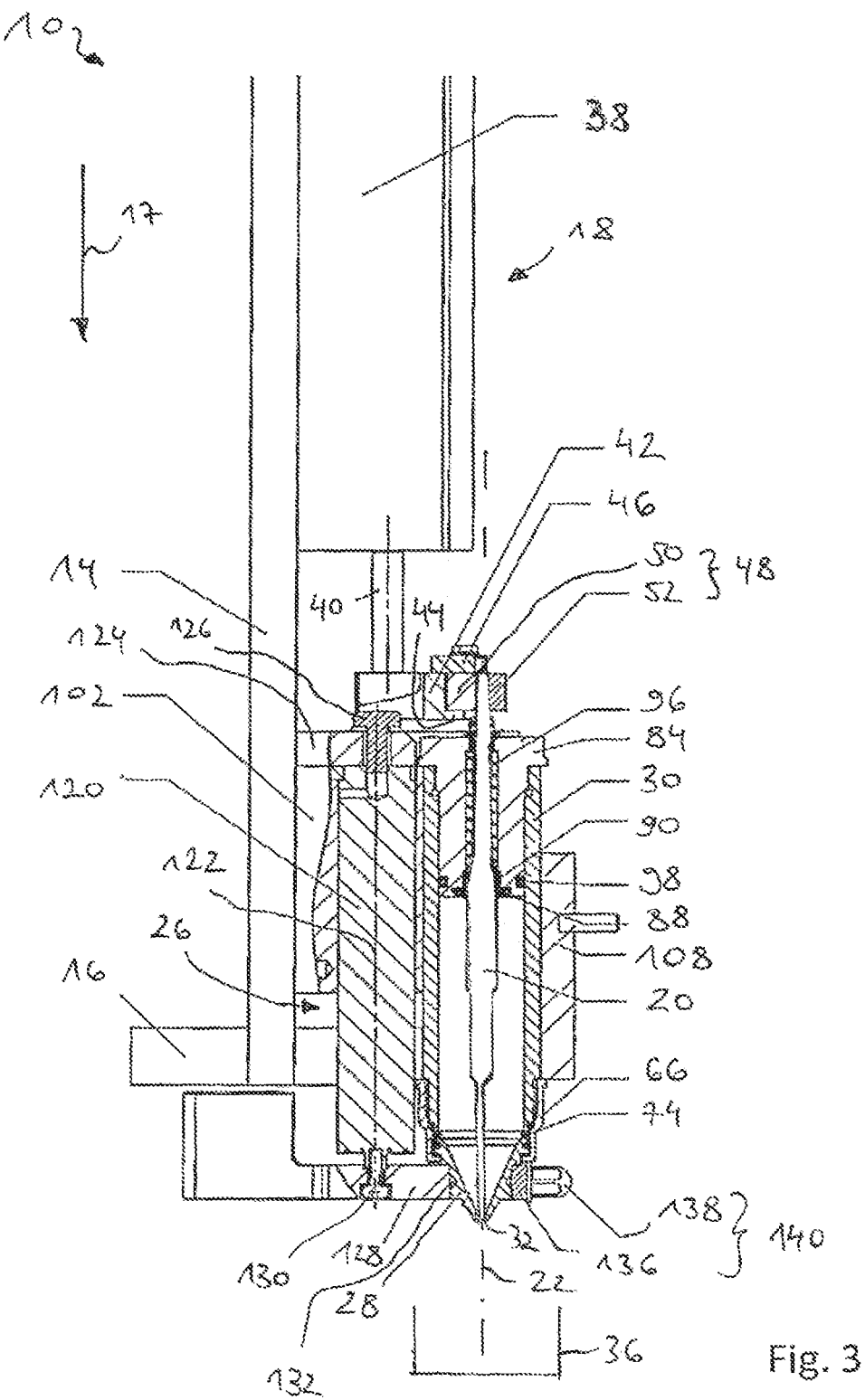
FIG. 3 is a side view, shown partially cutaway, of the device according to FIG. 1 in a viewing direction denoted III in FIG. 1.

The frame 12 additionally serves for the arrangement of a vibration means 26, see FIG. 3, by means of which a first container part 28 of the storage container 24 is movable, in particular parallel to the axis 22 along which the dosing control element 20 can be movably driven, relative to a second container part 30 that is fixed to the frame.

Figure 7:
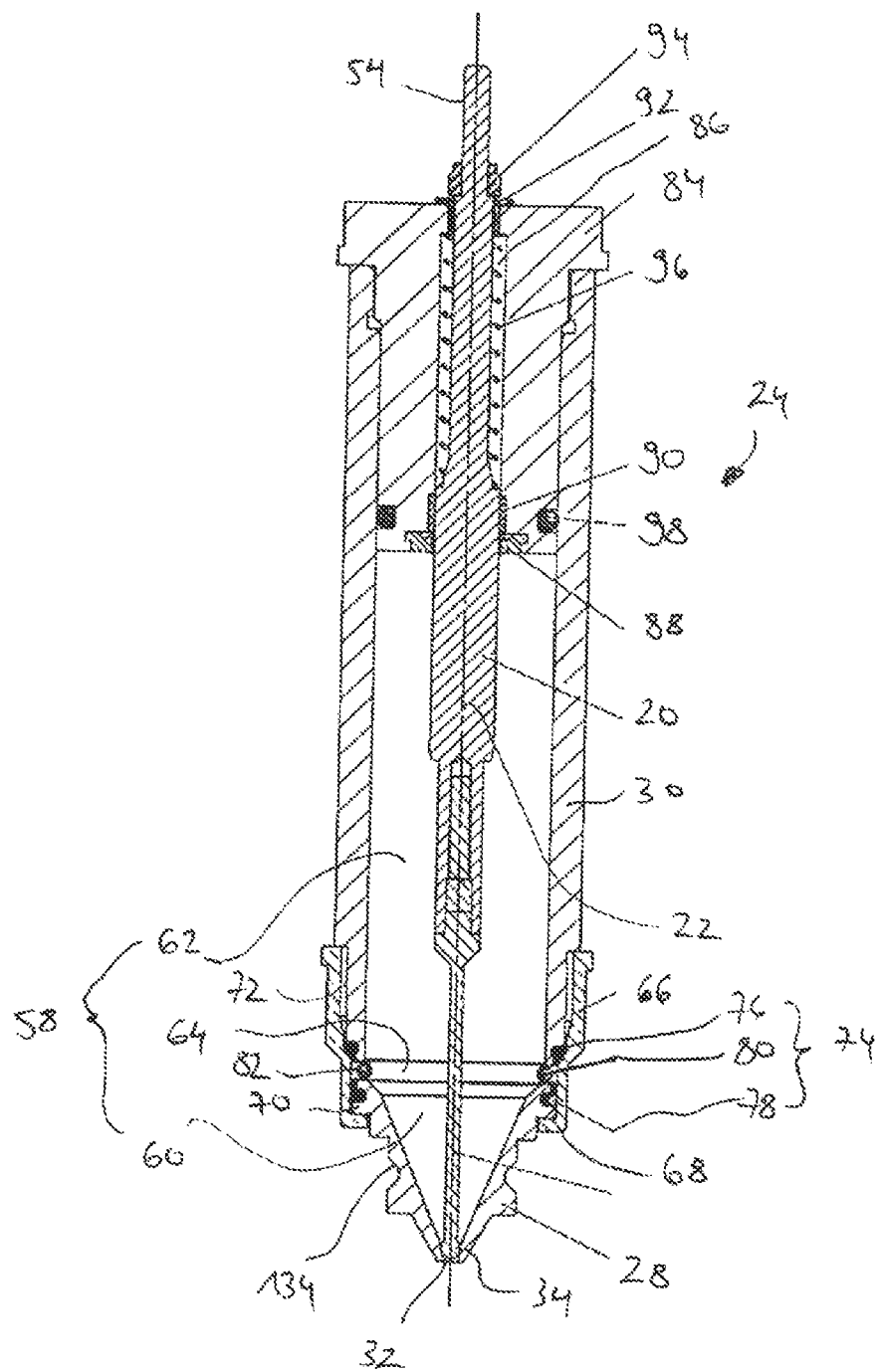
FIG. 7 is a vertical section of the storage container according to FIG. 5.

At its end that is at the bottom in the use position/dosing position of the storage container 24, the first container part 28 has a dosing opening 32 which, in a closing position of the dosing control element 20, is closed by a closure portion 34 of the dosing control element 20, see FIG. 7. Starting from this closing position, raising of the dosing control element 20 along the axis 22 leads to the dosing opening 32 being freed, so that powder stored in the storage container 24 is dosed into a target container 36, see FIG. 3.

Components of the device 10 will be described in greater detail hereinbelow.

The drive 18 for the dosing control element 20 has a drive housing 38 fixedly arranged on the frame 12. Two rods 40 which can be driven parallel to the direction 17 of gravity and are coupled with a drive plate 42 protrude from the drive housing, see FIG. 3.

The drive plate 42 has a lower coupling portion 44 which is spaced apart from an upper coupling portion 46. The two coupling portions 44 and 46 delimit, parallel to the axis 22 of the dosing control element 20, a chamber in which there is accommodated a clamping device 48 which comprises a clamping jaw 50 and a clamping lug 52. The clamping device 48 serves to clamp a drive portion 54 of the dosing control element 20, see FIG. 7.

The clamping lug 52 is adjustable in terms of its position relative to the clamping jaw 50, so that a distance between the clamping lug 52 and the clamping jaw 50 can be made larger and smaller. For this purpose there is provided, for example, a clamping screw 56, which passes through the clamping lug 52 and is screwed to the clamping jaw 50.

The construction of the storage container 24 will be described in greater detail hereinbelow, in particular with reference to FIG. 7. The storage container 24 has a continuous storage chamber 58 extending concentrically to the axis 22 of the dosing control element 20. A first sub-chamber 60 of the storage chamber 58 is delimited by a first container part 28; a second sub-chamber 62 of the storage chamber 58 is delimited by the second container part 30. Between the sub-chambers 60 and 62 there is formed a disk-shaped transition region 64 in which powder to be dosed is likewise disposed.

The container parts 28 and 30 are connected together by means of a connecting element 66 in such a manner that the first container part 28 is movable relative to the second container part 30 in a direction parallel to the axis 22.

The connecting element 66 engages with a shoulder 68 over an annular holding portion 70 of the first container part 28. At the other end, the connecting element 66 is releasably connected to the second container part 30 by means of a screw connection 72.

For sealing the storage chamber 58 in the transition region 64 there is provided a resilient tubular element 74 which outwardly bounds the transition region 64. The tubular element 74 has an annular first fastening portion which serves for sealing the connecting element 66 and the second container part 30. The tubular element 74 has a second fastening portion 78 which serves for sealing between the holding portion 70 of the first container part 28 and the connecting element 66. Between the two fastening portions 76 and 78 there extends a tubular membrane 80, which forms the actual radially outward boundary of the transition region 64.

For supporting the membrane 80 there is optionally provided an O-ring 82 which is arranged radially outwardly, relative to the membrane 80, and forms a resilient resistance element which prevents the membrane 80 from being squashed and which permanently spaces the two container parts 28 and 30 apart from one another.

The tubular element 74 and the O-ring 82 which is optionally present serve to connect the first container part 28 and the second container part 30 in a powder-tight manner and at the same time to uncouple the first container part 28 and the second container part 30 in terms of vibration.

The second container part 30 has at its end remote from the first container part 28 a container closure 84 which closes the second container part 30 in a powder-tight manner. At the same time, the container closure 84 serves to provide a powder-tight passage for the drive portion 54 of the dosing control element 20. For this purpose, the container closure 84 has a passage 86 and, at its end facing the storage chamber 58, a scraper 88 and a sliding bushing 90.

A corresponding sliding bushing 92 is arranged at the opposite end of the passage 86. Adjacent thereto, the dosing control element 20 carries a locking nut 94, which prevents the dosing control element 20 from being pushed too far into the storage container 24, which could damage the closure portion 34 and/or the dosing opening 32.

The dosing control element 20 is pretensioned in the direction of the closing position of the dosing control element 20, preferably by means of a compression spring 96 arranged in the passage 86.

Finally, a seal 98 is provided for sealing the container closure 84 and an inside wall of the second container part 30.

Figure 4:
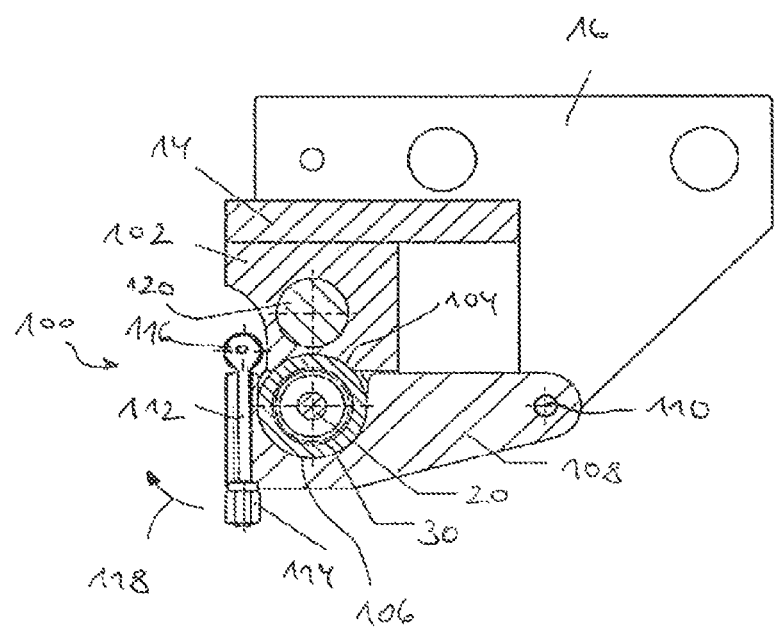
FIG. 4 is a horizontal section of the device according to FIG. 1 along a sectional plane denoted IV-IV in FIG. 2.

For fixing the second container part 30 to the frame 12, a clamping device 100 shown in FIG. 4 is provided. The clamping device 100 comprises a base body 102 which is fixedly connected to the first holding plate 14. The base body 102 forms a curved clamping surface 104, which serves to rest against the outer surface of the second container part 30. A second clamping surface 106 is formed by a clamping bracket 108 which is pivotable about a pivot axis 110, preferably a vertical pivot axis. The pivot axis 110 is arranged on the second frame plate 16.

For securing the clamping bracket 108 and for clamping the second container part 30, a pivot arm 112 having a securing element 114 is provided. The pivot arm 112 is pivotable about a pivot axis 116, which is arranged on the housing body 102, in a pivot direction 118 shown in FIG. 4 (after the securing element 114 has been released).

The housing body 102 also serves to accommodate a vibratory drive 120, see FIGS. 4 and 3. The vibratory drive 120 is preferably in the form of a piezo actuator which extends along a drive axis 122. The axis 122 of the vibratory drive 120 preferably runs parallel to the axis 22 of the dosing control element 20.

The vibratory drive 120 is fixed at an upper end, for example by means of a screw 126, to a holding plate 124 which is fixed to the frame. At the other end, the vibratory drive 120 is connected to a drive plate 128, for example by means of a screw connection 132. The drive plate 128 has a projection 132 which, based on the axis 22 of the dosing control element 20, cooperates in a positive-locking manner with a projection holder 134 of the first container part 28, see FIG. 7.

For connecting the drive plate 128 and the first container part 28 there is provided a clamping jaw 136 which is movable relative to the drive plate 128 and is secured with a securing element 138. A further clamping device 140 is thus provided, by means of which the drive plate 128 of the vibratory drive 120 can be releasably connected to the first container part 28.

The filling of a storage container 24 and the functioning of the device 10 will be described hereinbelow.

The storage container 24 is provided in the form of a cartridge which is held interchangeably on the device 10 and is shown in FIG. 5. The device 10 preferably comprises at least two cartridges.

For filling the storage container 24 in the form of a cartridge, the storage container, starting from the use position/dosing position shown in FIG. 5, is rotated through 180° so that, after rotation, the connecting element 66 and the first container part 28 are arranged above the second container part 30. The connecting element 66 is then unscrewed from the second container part 30; the first container part 28 and the tubular element 74, and optionally the O-ring 82, are removed.

In the "upside down" state of the second container part 30, the container closure 84, through which the drive portion 54 of the dosing control element 20 passes, forms a bottom closure for the second sub-chamber 62 of the second container part 30. The upper and free end of the second container part 30 can then be filled with a quantity of powder to be dosed. In order to simplify the filling process, a screw-on funnel 142, which cooperates with the screw connection 72, can be used. The screw-on funnel 142 is preferably sufficiently tall that the closure portion 34 of the dosing control element 20 is protected by the screw-on funnel 142.

When filling of the second container part 30 is complete, the screw-on funnel 142 which has optionally been used can be removed. The tubular element 74, optionally the O-ring 82 and the first container part 28 are then assembled, using the connecting element 66. As a result of the action of the compression spring 96, the closure portion 34 of the dosing control element 20 moves into its closing position, so that the dosing opening 32 is closed. The cartridge so filled can then be turned over again so that the dosing opening 32, as shown in FIG. 7, is again at the bottom end of the cartridge, or of the storage container 24.

In a following step, the clamping devices 48, 100 and 140 are so prepared that the filled storage container 24 can be fitted to the device 10.

The first container part 28 of the filled storage container 24 is first inserted into the drive plate 128. The second container part 30 is then fixed to the frame 12 by means of the clamping device 100. The drive plate 128 is subsequently connected to the first container part 28 by actuation of the clamping device 140. Finally, by actuation of the clamping device 48, an operative connection is produced between the drive 18 for the dosing control element 20 and the drive portion 54 of the dosing control element 20.

For filling of a target container 36, the drive 18 is actuated in such a manner that the dosing control element 20, starting from the closing position (the closure portion 34 is in contact with the dosing opening 32), is raised and a freeing position is reached. In order to assist with the delivery of powder to be dosed, the vibratory drive 120 is actuated so that (with the second container part 30 stationary) the first container part 28 is set in vibration parallel to the axis 22 of the dosing control element 20.

It is possible that the quantity of powder delivered from the dosing opening 32 is monitored by means of a volume flow measuring device, not shown. Alternatively or in addition, it is also possible that the weight of the quantity of powder dosed into the target container is monitored by means of a weight measuring device (not shown). The above-mentioned measuring devices can thus provide actual values, which are used by a control device (not shown) for controlling the drive 18 of the dosing control element 20 and/or of the vibratory drive 120. Thus, in the case of a deviation from predefined target values, the control device controls the drive 18 and/or the vibratory drive 120 in such a manner that a predefined target value for a quantity of powder to be dosed is reached. This control can be accompanied by a change in the freeing position of the dosing control element 20 and/or a change in the stroke and/or frequency of the vibratory drive 120.

The invention claimed is:

1. Device (10) for dosing a powder, the device having a storage container (24) which has a storage chamber (58) for storing a stored quantity of the powder to be dosed, wherein the storage container (24) has a dosing opening (32), wherein the device (10) has a dosing control element (20) which can be movably driven and which, in a closing position, closes the dosing opening (32) and, in at least one freeing position, frees the dosing opening (32) for the dispensing of powder from the storage container (24) into a target container (36) to be filled, wherein the device (10) has a vibration means (26) which sets the powder in vibration in order to assist with the dispensing of powder, characterized in that the storage container (24) has two container parts (28, 30) which are movable relative to one another and which delimit mutually connected sub-chambers (60, 62) of the storage chamber (58) and each store a portion of the stored quantity of powder, wherein a first container part (28) has the dosing opening (32) and wherein the vibration means (26) cooperates with the first container part (28) and thus sets the portion of the powder that is disposed in the first container part (28) in vibration, and wherein the vibration means (26) is uncoupled from the second container part (30).

2. Device (10) according to claim 1, characterized in that the first container part (28) is funnel-shaped.

3. Device (10) according to claim 1, characterized in that the second container part (30) is cylindrical.

4. Device (10) according to claim 1, characterized in that mutually facing cross-sections of the two sub-chambers (60, 62) are of the same size.

5. Device (10) according to claim 1, characterized in that, based on the direction (17) of gravity, the first container part (28) is arranged at the bottom and the second container part (30) is arranged at the top.

6. Device (10) according to claim 1, characterized in that there is arranged between the container parts (28, 30) at least one resilient annular or tubular element (74) which bounds a transition region (64) between the sub-chambers (60, 62) of the storage container (24).

7. Device (10) according to claim 6, characterized in that, for connecting the container parts (28, 30), a connecting element (66) is provided which radially outwardly surrounds the at least one annular or tubular element (74).

8. Device (10) according to claim 7, characterized in that the connecting element (66) can be connected or is connected releasably to the first container part (28).

9. Device (10) according to claim 1, characterized in that the second container part (30) has a container closure (84) through which a drive portion (54) of the dosing control element (20) passes in a powder-tight manner.

10. Device (10) according to claim 1, characterized in that the storage container (24) is in the form of a cartridge which is held interchangeably on the device (10).

11. Device (10) according to claim 1, characterized in that the device (10) comprises at least two cartridges, wherein a first cartridge is held on the device (10) and wherein a second cartridge contains a further stored quantity of the powder to be dosed.

12. Device (10) according to claim 1, characterized in that the device (10) has a frame (12) on which a drive (18) for the dosing control element (20) and/or a vibratory drive (120) for the vibration means (26) is or are arranged.

13. Device (10) according to claim 1, characterized in that the device (10) has a clamping device (140) for the releasable connection of the vibration means (26) and the first container part (28) and/or a clamping device (100) for the releasable connection of the frame (12) and the second container part and/or a clamping device (48) for the releasable connection of a drive (18) for the dosing control element (20) and the dosing control element (20).

14. Device (10) according to claim 1, characterized in that the device (10) has a volume flow measuring device, in particular a capacitive volume flow measuring device, for measuring a volume flow of the powder dispensed from the storage container (24) into the target container (36) to be filled, and/or in that the device (10) has a weight measuring device for measuring the weight of the quantity of powder dispensed into the target container (36).

15. Device (10) according to claim 14, characterized in that the device (10) has a control device for controlling the vibration means (26) and the drive (18) of the dosing control element (20), and in that the control device is coupled with the volume flow measuring device and/or with the weight measuring device.

16. Device (10) according to claim 1, wherein the powder to be dosed is a pulverulent pharmaceutical.

\* \* \* \* \*